United States Patent
Hödlmoser et al.

(10) Patent No.: US 12,474,232 B2
(45) Date of Patent: Nov. 18, 2025

(54) DEVICE AND METHOD FOR CALIBRATING A LIGHT PROJECTOR

(71) Applicant: emotion3D GmbH, Vienna (AT)

(72) Inventors: Michael Hödlmoser, Schörfling (AT); Florian Seitner, Vienna (AT); Robert Fischer, Vienna (AT); Matej Nezveda, Vienna (AT)

(73) Assignee: emotion3D GmbH, Vienna (AT)

( * ) Notice: Subject to any disclaimer, the term of this patent is extended or adjusted under 35 U.S.C. 154(b) by 324 days.

(21) Appl. No.: 17/913,571

(22) PCT Filed: Mar. 22, 2021

(86) PCT No.: PCT/EP2021/057206
§ 371 (c)(1),
(2) Date: Sep. 22, 2022

(87) PCT Pub. No.: WO2021/191121
PCT Pub. Date: Sep. 30, 2021

(65) Prior Publication Data
US 2023/0109225 A1    Apr. 6, 2023

(30) Foreign Application Priority Data

Mar. 24, 2020 (AT) ................ A 50244/2020

(51) Int. Cl.
*G01M 11/06* (2006.01)
*G06T 7/73* (2017.01)

(52) U.S. Cl.
CPC ............. *G01M 11/065* (2013.01); *G06T 7/74* (2017.01); *G06T 2207/10028* (2013.01);
(Continued)

(58) Field of Classification Search
CPC ..... G01M 11/065; G01M 11/064; G06T 7/74; G06T 2207/10028; G06T 2207/30204;
(Continued)

(56) References Cited

U.S. PATENT DOCUMENTS 9,061,631 B2    6/2015  Totzauer
2003/0116698 A1  6/2003  Hayashi
(Continued)

FOREIGN PATENT DOCUMENTS

CN    110466458     11/2019
DE    102012020855   4/2014
(Continued)

OTHER PUBLICATIONS

International Preliminary Report on Patentability Dated May 27, 2022 From the International Preliminary Examining Authority Re. Application No. PCT/EP2021/051825. (5 Pages).
(Continued)

*Primary Examiner* — Timothy P Graves

(57) ABSTRACT

A device and a method for calibrating a light projector (1) with adaptable luminous elements (3) arranged in an image plane (2), comprising a camera (4) and a control unit (5) connected to the light projector (1) and the camera (4), wherein the light projector (1) is configured to project in temporal succession at least two test images (6, 6') with at least two comparison structures (9, 9') from the image plane (2) to an arbitrarily extending projection surface (7), the camera (4) is a depth camera configured to record at least two camera images of a recording surface (8) in a manner substantially synchronized temporally with the light projector (1), and to detect the three-dimensional position data of the comparison structures (9, 9') in the camera images, and the control unit (5) is configured to determine the position and orientation of the light projector (1), and to calculate the
(Continued)

translational displacement and rotational twist between camera (4) and projector (1).

14 Claims, 1 Drawing Sheet

(52) U.S. Cl.
CPC ............... *G06T 2207/30204* (2013.01); *G06T 2207/30244* (2013.01); *G06T 2207/30252* (2013.01)

(58) Field of Classification Search
CPC . G06T 2207/30244; G06T 2207/30252; G06T 7/73; G06T 7/80
See application file for complete search history.

(56) References Cited

U.S. PATENT DOCUMENTS

2019/0385272 A1* 12/2019 Aoki ................ G09G 3/001
2021/0016705 A1* 1/2021 Hartisch ................ G06T 7/70

FOREIGN PATENT DOCUMENTS

| DE | 102018210028 | 12/2019 |
| DE | 102018210902 | 1/2020 |
| EP | 2952661 | 12/2015 |
| EP | 3581440 | 12/2019 |
| WO | WO 2021/175516 | 9/2021 |

OTHER PUBLICATIONS

Internationaler Recherchenbericht und Schriftlicher Bescheid [International Search Report and the Written Opinion] Dated Apr. 8, 2021 From the International Searching Authority Re. Application No. PCT/EP2021/051825 and Its Translation of Search Report Into English. (13 Pages).

Internationaler Vorläufiger Bericht zur Patentierbarkeit [International Preliminary Report on Patentability] Dated May 27, 2022 From the International Preliminary Examining Authority Re. Application No. PCT/EP2021/051825. (23 Pages).

* cited by examiner

DEVICE AND METHOD FOR CALIBRATING A LIGHT PROJECTOR

RELATED APPLICATIONS

This application is a National Phase of PCT Patent Application No. PCT/EP2021/057206 having International filing date of Mar. 22, 2021, which claims the benefit of priority of Austria Patent Application No. A50244/2020 filed on Mar. 24, 2020. The contents of the above applications are all incorporated by reference as if fully set forth herein in their entirety.

FIELD AND BACKGROUND OF THE INVENTION

The invention relates to a device and a method for calibrating a light projector.

Nowadays, vehicles have front lights which can adaptively illuminate a scene or project complex projection patterns into the scene. This allows, for example, to partially dim on oncoming vehicles so as not to dazzle the occupants of these vehicles or to project information in front of pedestrians or other road users.

In order to be able to implement appropriate lighting strategy, objects relevant to this lighting strategy are normally detected by means of a camera and the lighting is adapted based on their 2D position in the camera image. The specific relationship between the 2D object detected in the camera image and the light pattern used on the light projector (2D array with intensity values that determines the illumination intensity for each element of the light projector) is currently determined empirically and is therefore inaccurate.

This currently makes it impossible to illuminate areas in a scene with high precision and quality by means of adaptive front lights (for example, for targeted fade in/out, projecting information to specific areas in a 3D scene).

Especially at greater distances, this inaccuracy has a correspondingly greater effect, which is why the use of adaptive lighting strategies is currently mostly limited to a few and very coarse light patterns. The use of fine light patterns (e.g. for the targeted projection of warnings and indications in the proximity of pedestrians; for dimming/reducing the lighting intensity for highly reflective traffic signs; for indicating vulnerable road users by "flashing") cannot currently be implemented satisfactorily in practice.

Further, mechanical stress (for example, vibrations) can over time lead to incorrect positioning or displacement of the front lights with respect to the camera. This is mostly not recognised by the driver and also not signalled by the vehicle, but leads to a correspondingly reduced lighting quality of the scene (for example dazzling of oncoming or preceding road users by the adaptive lighting).

Known calibration methods mostly aim at an initial coarse calibration of the lighting (in production) and the manual detection of maladjustments. Even after detecting a maladjustment, readjustments are carried out coarsely, manually, and in specialist workshops, calibrating camera and projector to each other using predefined test patterns in a controlled environment. In both methods, initial calibration and readjustment, no emphasis is placed on three-dimensional calibration.

SUMMARY OF THE INVENTION

According to the invention, these and other problems are solved by a device and a method according to the independent claims.

A device according to the invention comprises a light projector with adaptable light elements arranged in an image plane. This may be an adaptive headlight of a vehicle, for example a car, equipped with selectively activatable LED light elements or the like which allow any optical pattern to be projected into a projection surface.

The projection surface may, for example, be on a road, a building or on another road user. The projection surface does not have to be flat or homogeneous, but may have any three-dimensional shape.

Further, a camera is provided, which is designed to capture a capturing surface. This may be, for example, a vehicle camera that is permanently installed in a vehicle and is arranged in the upper area of the windscreen or in the front area of the vehicle front, for example in the area of the headlights of the vehicle.

The approximate spatial correlation, i.e. the 3D rotation and 3D translation, between the light projector and the camera may be known in advance as an initial value, not least to ensure an overlap of the projection surface with the capturing surface. However, this is not strictly necessary.

According to the invention, the camera is designed as a depth camera, for example a stereo camera, a Time-of-Flight (TOF) camera, a LiDAR or the like. It may also be a camera assembly, i.e. several interconnected cameras, each capturing a two-dimensional image from a different angle. Thereby, for each point of the camera image, its three-dimensional position data can be determined in relation to an internal coordinate system.

According to the invention, both the light projector and the camera are connected to an electronic control unit or a data processing unit. The control unit may be designed as a microcontroller or microcomputer and comprise a central processing unit (CPU). The control unit is connected to a storage unit, for example in form of a volatile semiconductor memory (RAM), a non-volatile semiconductor memory (ROM, SSD hard disk), a magnetic memory (hard disk), and/or an optical memory (CD-ROM). Further, the control unit comprises interface units (Ethernet, USB) and the like. The parts of such electronic components are generally known to those skilled in the art.

According to the invention, the light projector is designed to project in temporal sequence at least two test images with at least two comparison structures from the image plane to an arbitrarily arranged projection surface. The image plane is the plane in which the light elements of the light projector are arranged.

The comparison structures may preferably be visually concise structures (markers) which are easily recognisable by the camera, even in the case where the projection surface is highly inhomogeneous and not flat. In the case of a headlight as a projector, for example, these may be uniformly distributed circles and/or projections of circles that are formed by the light beams hitting the projection surface. In order to simplify the detection of correlating comparison structures in at least two camera images, the projector may, for example, be designed to generate test images with different comparison structures, or also comparison structures in different colours or geometries, at defined time intervals.

The two test images transmitted consecutively must be at least partially identical, so that the comparison structures used on them are also identical. This facilitates the recognition of the comparison structures in both test images, even in case of highly distorted captured images. The test images are projected while the distance between the light projector and the projection surface changes, that is, preferably when the vehicle is moving. However, it may also be provided that the vehicle is stationary and the projection surface is moving, for example in a test environment.

The camera is designed to capture at least two camera images of a capturing surface substantially synchronised in time with the light projector, the capturing surface substantially comprising the projection surface. The capturing surface is located at a distance in front of the light projector and substantially comprises the projection surface.

In other words, the projection surface is substantially part of the capturing surface so that the camera can capture the entire projected image. The capturing surface does not have to be flat as well, but may be structured as desired.

Further, the camera is designed to detect the three-dimensional position data of the at least two comparison structures in the at least two captured camera images. Therefore, the camera provides at least four three-dimensional coordinates, namely the coordinates of two recognised comparison structures at two different points in time.

According to the invention, the control unit is designed to determine the position and orientation of the light projector from the at least four detected three-dimensional position data of the comparison structures. This can be done by the control unit reconstructing two light beams that run through one and the same comparison structure, but at different points in time. The intersection of the two light beams determines the position of the light projector.

Further, the control unit is designed to calculate the translational displacement between camera and projector. Further, the control unit may also be designed to calculate the rotational torsion between camera and projector. In this respect, a rotational torsion between camera and projector may be a torsion around a rotation axis arbitrarily arranged in the three-dimensional space, for example around a vertical or horizontal rotation axis. In particular, the invention also relates to a vehicle with a device according to the invention. In this case, the control unit may be designed to detect a relative torsion between camera and projector about a longitudinal axis (roll axis) or a transverse axis (pitch axis or yaw axis) of the vehicle running in any direction. A relative torsion may be detected even when the position of the camera and/or the projector relative to the vehicle is unchanged.

Additionally, the control unit may also be designed to calculate the translational displacement between camera and projector relative to an initial position by comparing the determined coordinates of the light projector with a previously stored initial position. Further, the control unit may also be designed to calculate the rotational torsion relative to an initial position by comparing the determined coordinates of the light projector with a previously stored initial orientation.

In other words, by emitting two test images onto a projection surface which move relative to the internal coordinate system of the camera and detecting the position of comparison structures on the projection surface, the control unit can reconstruct the position of the emitting light projector. Assuming that, for each of the identified comparison structures, the projection line runs through the at least two 3D points captured consecutively, the intersection of the projection lines corresponds exactly to the centre of the light projector. After the 3D points are described in the coordinate system of the camera unit, the intersection and therefore the centre of the light projector is automatically described in the same coordinate system. Accordingly, the relative orientation between the camera and the light projector, which is described through a rotation and a translation, can also be determined.

By comparing this calculated position, an internally stored initial positional relationship between the light projector and the camera can be corrected. If no initial positional relationship is available yet, the determined translational displacement between camera and projector can be set as initial positional relationship. Further, an initially stored torsion between light projector and camera may also be corrected by determining the actual torsion based on the captured camera images. If no initial torsion is available yet, the determined rotational torsion between camera and projector can be set as initial torsion. The control unit may store the determined translational displacement and rotational torsion in the storage unit for later use.

According to the invention, the control unit may be designed to balance the translational displacement and/or the rotational torsion between light projector and camera by mechanically adjusting the light projector or the light elements.

The control unit may also be designed to control the light elements of the light projector during operation in such a way that the translational displacement and/or the rotational torsion between light projector and camera are balanced without mechanical adjustment.

The device according to the invention may be designed to perform these steps while the vehicle is in operation, that is, while the vehicle is moving. The captured, at least two, camera images differ in their recorded position data of the individual pixels, and, optionally, also in the optical details themselves.

Such a device according to the invention allows in practice a variety of advantageous applications. This allows the light projector to be calibrated not only in a test environment, but at any time during operation. Changes in the orientation between the light projector and the camera can be detected and balanced during operation. Further, adaptive illumination patterns may be clearly projected into 3D space by adjusting the image patterns to be sent based on the detected and stored position correlation in such a way that displacement and torsion are corrected.

Consequently, even with a rotated or displaced light projector, substantially correct projections of desired image patterns can be obtained. In particular, in a device according to the invention, by determining the correlation between the light projector and the camera, it can be unambiguously determined which light elements in the light projector must be activated in order to send a projection beam to a 3D position of a specific object and illuminate it; this knowledge can be used for targeted lighting strategies.

The invention further comprises a method for calibrating a light projector with adaptable light elements arranged in an image plane, wherein the light projector projects, in temporal sequence, at least two test images with at least two comparison structures into a projection surface running in any direction, a camera designed as a depth camera captures at least two camera images of a capturing surface, which substantially comprises the projection surface, substantially synchronised in time with the light projector, detects the three-dimensional position data of the at least two comparison structures in the camera images, a control unit determines the position and orientation of the light projector from the three-dimensional position data of the comparison structures, and, if necessary, calculates the translational displacement and rotational torsion between camera and projector by comparing the position and orientation of the light projector with a previously stored initial position and initial orientation.

According to the invention, it may be provided that the control unit balances the translational displacement and the rotational torsion between camera and light projector by adjusting the light projector.

According to the invention, it may provided that the control unit controls the light elements of the light projector during operation in such a way that the translational displacement and rotational torsion between camera and projector are balanced.

BRIEF DESCRIPTION OF THE SEVERAL VIEWS OF THE DRAWINGS

The invention further comprises a computer-readable storage medium comprising instructions that cause an electronic control unit to execute a method according to the invention.

Further features according to the invention result from the claims, the exemplary embodiments and the figures.

In the following, the invention is explained on the basis of a non-exclusive exemplary embodiment.

Figure 1:
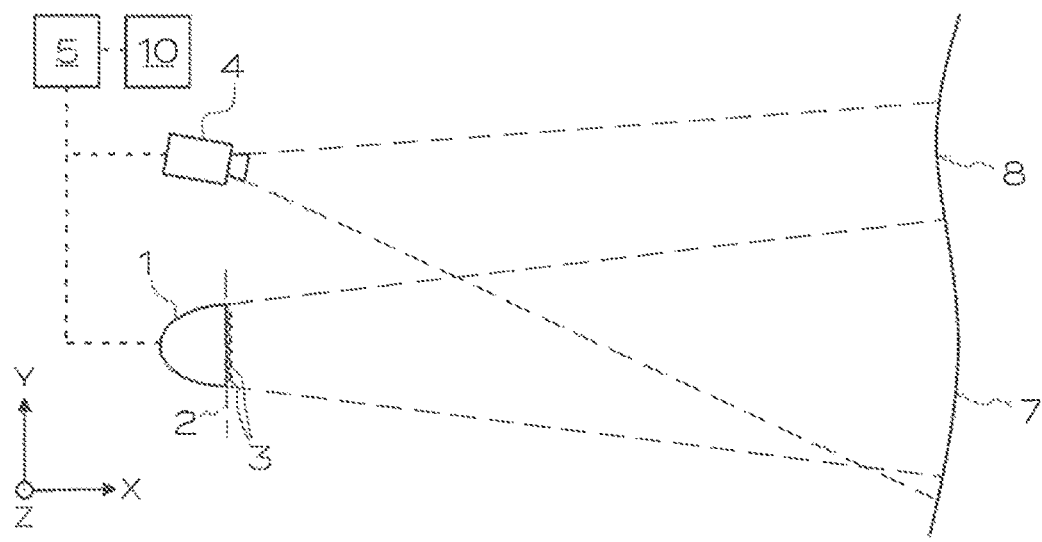
Figure 2:
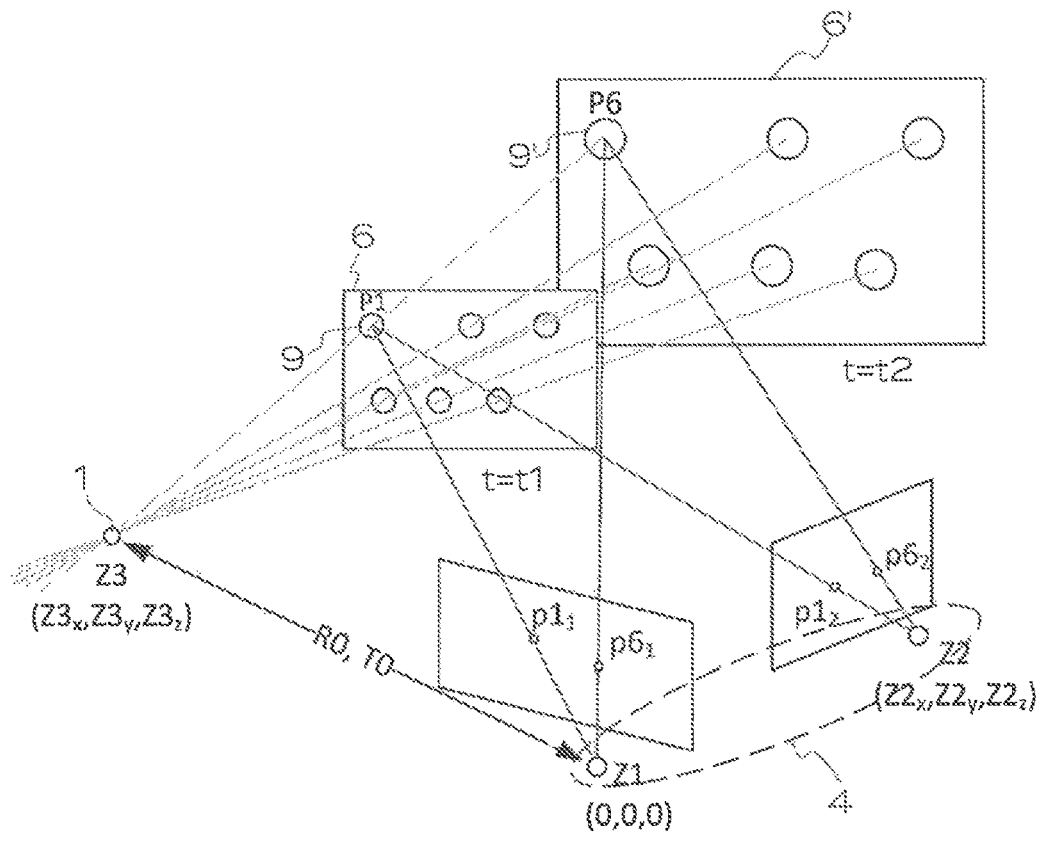

FIG. 1 shows a schematic view of an embodiment of a device according to the invention in a vehicle;

FIG. 2 shows a schematic view of the spatial relationship between the projected and captured images.

DESCRIPTION OF SPECIFIC EMBODIMENTS OF THE INVENTION

FIG. 1 shows a schematic view of an embodiment of a device according to the invention in a vehicle. The device comprises a light projector 1 with light elements 3 arranged in an image plane 2, for example LEDs or laser light sources. The light projector 1 projects a test image 6 onto a projection surface 7, in this case the landscape in front of it, for example house fronts or the like. The test image 6 may also be designed as a single laser beam or the like.

A camera 4 is also located on the vehicle and is directed towards the projection surface 7. The camera 4 captures a capturing surface 8 which, in this example, entirely comprises the projection surface 7. Therefore, the camera 4 can capture the entire test image 6 projected by the light projector 1. While the image plane 2 is usually flat, the capturing surface 8 and the projection surface 7 are arbitrarily curved surfaces, for example building façades or the like. In this exemplary embodiment, the camera 4 is designed as stereo camera with two individual cameras, and therefore it is able to determine the three-dimensional position data of the received pixels for each captured camera image (or detected laser pulse). The position data is recorded in relation to an internal coordinate system of the camera 4. For example, the camera 4 may be designed as a stereo camera with two individual cameras arranged next to each other, wherein the 3D position data is calculated from the data of the two individual cameras.

The light projector 1 and the camera 4 are connected to an electronic control unit 5, for example of an on-board computer, which is connected to an electronic storage unit 10. The control unit 5 knows the internal coordinate system of the camera 4 and the light projector 1 and can optionally also know their initial relations to each other. Therefore, the control unit optionally knows both the three-dimensional distance and the rotation between camera 4 and light projector 1.

During operation, the control unit 5 sends the light projector 1 the command to project a test image 6 into the projection surface 7, and, in synchrony with this, sends the camera 4 the command to capture a camera image from the capturing surface 8.

FIG. 2 shows a schematic view of the spatial relationship between the images projected by the light projector 1 (symbol Z3) and the images captured by the camera 4. In this view, the camera 4 is formed by a stereo camera with two individual cameras Z1, Z2 arranged next to each other. In order to be able to reconstruct the light beams emitted by the light projector 1, it is necessary to change the relationship between the light projector 1 and the projection surface 7.

This may be achieved on the one hand by moving the projection surface 7, but on the other hand also by moving the light projector 1, wherein the relative positioning between light projector 1 and camera 4 remains the same.

A movement of the projection surface 7 in combination with the movement of the light projector 1 may be achieved in practice, for example, by a moving car on which the system is mounted. Different 3D points of the incident light beams are then reconstructed at different times. It is necessary that the origin of the respective coordinate system does not change for the reconstruction of the points. This is achieved by not merging the respective 3D coordinates into a global coordinate system. Instead, the reconstructed points are in local but equivalent coordinate systems. The origin of the coordinate system is located in the camera centre of the left camera Z1. The relative orientation of the camera to the light projector 1 calculated in the coordinate system is equal to RO and TO.

The light projector Z3 projects a first test image 6 into the projection surface 7 at time t1, and a second test image 6' at time t2. The test images 6, 6' each comprise identical comparison structures 9, 9', for example in form of distinctive reticles or the like. In the meantime, the distance between the projection surface 7 and the light projector 1 has increased, so that the positions P1 and P6 of the comparison structures 9, 9' have changed.

The light beams hit any surface during operation, wherein the illuminated points are detected in both individual cameras Z1, Z2 of the camera 4. From the individual images, the 3D position of each point located on the emitted light beam can be calculated.

The camera 4 determines the location coordinates of the points P1 at time t1 and P6 at time t2 by temporally synchronised recording of the capturing surfaces 8. P1 and P6 are the same comparison structure which is projected at different times while the vehicle is in motion.

The coordinates of the left stereo camera Z1 are known and form the origin of the internal coordinate system (0, 0, 0) in this exemplary embodiment; the coordinates of the right stereo camera are also known as $(Z2_x, Z2_y, Z2_z)$ in this coordinate system. The coordinates of the light projector 1, specified as $(Z3_x, Z3_y, Z3_z)$, are not known with certainty here, but are calculated by the control unit 5. The objective of the method is to determine the schematically indicated translation TO and rotation RO, i.e. the geometric relationship, between the light projector and the camera.

On the basis of the coordinates of the comparison structure determined by the left camera at time t1 and t2, namely ($p1_1$ and $p6_1$), and the coordinates of the comparison structure determined by the right camera at time t1 and t2, namely ($p1_2$ and $p6_2$), the control unit 5 calculates the trajectory of the light beam running through the points P1 and P6.

By generating multiple different light beams emitted by the light projector 1, the centre of the light projector 1 can be determined by the intersection of these light beams. In practice, it must be ensured that a distinction can be made between the different emitted light beams in the individual cameras Z1, Z2 (which appear as different points in the camera images), as the clear assignment of incident light beams in the left and right camera image is necessary in order to be able to calculate a 3D point. This is achieved by using identical comparison structures 9, 9'.

By comparing the positions of one or more further comparison structures, the trajectory of further light beams schematically indicated in the figure can be calculated. The intersection of two or more emitted light beams with two or more comparison structures results in the position of the light projector 1, from which the control unit calculates the distance TO and the rotation RO to the position of the camera 4.

Subsequently, the control unit 5 stores this determined displacement TO and torsion RO in the storage unit 10 and activates one or more actuators to mechanically displace or rotate the light projector 1 in such a way that displacement or torsion are balanced during operation.

In an alternative embodiment, in which the light projector 1 cannot be displaced or rotated by the control unit, the control unit 5 electronically changes the images to be emitted by the light projector 1 during operation in such a way that the displacement or torsion are balanced.

According to the invention, it may be provided that objects or areas of interest in the camera (for example in the left or right image of the stereo camera) are identified via image analysis and their 3D position is determined (for example in the case of a stereo camera via stereo reconstruction). By means of the determined correlation RO, TO between light projector and camera, it can be determined which light elements in the light projector must be activated in order to emit a projection beam to the 3D position of the object and illuminate it; this knowledge can be used for targeted lighting strategies.

The invention is not limited to the described exemplary embodiments, but also comprises further embodiments of the present invention within the scope of the following patent claims.

LIST OF REFERENCE SIGNS

1 Light projector
2 Image plane
3 Light elements
4 Camera
5 Control unit
6, 6' Test image
7 Projection surface
8 Capturing surface
9, 9' Comparison structure
10 Storage unit

The invention claimed is:

1. A device for calibrating a light projector with adaptable light elements arranged in an image plane, comprising
   a. a control unit connected to the light projector and the camera, and
   b. a storage unit connected to the control unit, wherein
   c. the light projector is configured to project in temporal sequence at least two identical test images with at least two comparison structures in the form of visually concise structures from the image plane to a projection surface during a spatial change of the light projector relative to the projection surface and while the relative positioning between the light projector and camera remains constant,
   d. a depth camera configured to
      i. capture at least two camera images of a capturing surface synchronised in time with the light projector, the capturing surface substantially comprising the projection surface,
      ii. detect the three-dimensional position data of the identical comparison structures in the camera images,
   wherein the control unit is configured to
      i. determine the position and orientation of the light projector (1) from the three-dimensional position data of the identical comparison structures by reconstructing two light beams that run through one and the same comparison structure at different points in time, and determining the intersection of the two light beams, and
      ii. calculate the translational displacement and rotation between camera and projector relative to an initial position by comparing the determined coordinates of the light projector with a previously stored initial position;
   wherein the visually concise structures are selected from a group consisting of reticles and evenly spaced circles.

2. The device according to claim 1, wherein the control unit is configured to balance the translational displacement and rotation between camera and projector by adjusting the light projector.

3. The device according to claim 2, further comprising controlling, by the control unit, the light elements of the light projector during operation in such a way that the translational displacement and rotation between camera and projector are balanced.

4. The device according to claim 2, wherein the light projector is an adaptive headlight of a vehicle.

5. The device according to claim 1, wherein the control unit is configured to control the light elements of the light projector during operation in such a way that the translational displacement and rotation between camera and projector are balanced.

6. The device according to claim 1, wherein the light projector is an adaptive headlight of a vehicle.

7. The device according to claim 6, wherein the camera is a stereo camera, a Time-of-Flight (TOF) camera, and a LiDAR.

8. The device according to claim 1, wherein the camera is a stereo camera, a Time-of-Flight (TOF) camera, and a LiDAR.

9. A method for calibrating a light projector with adaptable light elements arranged in an image plane, comprising
   projecting, by a light projector, in temporal sequence at least two test images with at least two identical comparison structures in the form of visually concise structures to a projection surface during a spatial change of the light projector relative to the projection surface and while the relative positioning between the light projector and camera remains constant,
   capturing, by a depth camera, at least two camera images of a capturing surface synchronised in time with the light projector, the capturing surface substantially comprising the projection surface, detecting, by a control unit, a three-dimensional position data of the identical comparison structures in the camera images, wherein the control unit is configured to detect the three dimensional position data by:

wherein the visually concise structures are selected from a group consisting of reticles and evenly spaced circles;

wherein the control unit is configured to detect the three-dimensional position data by:
i. determining the position and orientation of the light projector from the three-dimensional position data of the identical comparison structures relative to an initial position by comparing the determined coordinates of the light projector with a previously stored initial position, and
ii. calculating the translational displacement and rotation between camera and projector.

10. The method according to claim 9, further comprising balancing, by the control unit, the translational displacement and rotation between camera and projector by adjusting the light projector.

11. The method according to claim 10, further comprising controlling, by the control unit, the light elements of the light projector during operation in such a way that the translational displacement and rotation between camera and projector are balanced.

12. A tangible, non-transitory computer-readable storage medium having stored there on a computer program instructions for performing a method for calibrating the light projector with the adaptable light elements arranged in the image plane, comprising
projecting, by a light projector, in temporal sequence at least two test images with at least two identical comparison structures in the form of visually concise structures to a projection surface during a spatial change of the light projector relative to the projection surface and while the relative positioning between the light projector and camera remains constant,
capturing, by a depth camera, at least two camera images of a capturing surface synchronised in time with the light projector, the capturing surface substantially comprising the projection surface, detecting, by a control unit, a three-dimensional position data of the identical comparison structures in the camera images, wherein the control unit is configured to detect the three-dimensional position data by:
i. determining the position and orientation of the light projector from the three-dimensional position data of the identical comparison structures relative to an initial position by comparing the determined coordinates of the light projector with a previously stored initial position, and
ii. calculating the translational displacement and rotation between camera and projector.

13. The tangible, non-transitory computer-readable storage medium, comprising instructions which cause an electronic unit to perform a method according to claim 12 further comprising balancing, by the control unit, the translational displacement and rotation between camera and projector by adjusting the light projector.

14. The tangible, non-transitory computer-readable storage medium according to claim 12 further comprising controlling, by the control unit, the light elements of the light projector during operation in such a way that the translational displacement and rotation between camera and projector are balanced.

* * * * *